(12) United States Patent
Kirkland (10) Patent No.: US 7,315,902 B2
(45) Date of Patent: Jan. 1, 2008

(54) COMPRESSION AND ABBREVIATION FOR FIXED LENGTH MESSAGING

(75) Inventor: Dustin C. Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 10/324,516

(22) Filed: Dec. 19, 2002

(65) Prior Publication Data

US 2004/0122979 A1  Jun. 24, 2004

(51) Int. Cl.
G06F 7/00 (2006.01)
G06F 7/20 (2006.01)
G06F 15/16 (2006.01)
G06F 17/30 (2006.01)
H04Q 7/20 (2006.01)

(52) U.S. Cl. ............................ 709/247; 455/466; 707/4
(58) Field of Classification Search ...................... 707/4
See application file for complete search history.

(56) References Cited

U.S. PATENT DOCUMENTS

| 4,459,049 A | * | 7/1984 | Howell et al. ................. 400/98 |
| 4,486,857 A | * | 12/1984 | Heckel ........................ 715/508 |
| 4,760,528 A | * | 7/1988 | Levin .......................... 715/534 |
| 4,969,097 A | * | 11/1990 | Levin .......................... 715/534 |
| 5,231,579 A | * | 7/1993 | Tsuchiya et al. ............. 715/508 |
| 5,305,205 A | * | 4/1994 | Weber et al. ................. 715/531 |
| 5,596,656 A |   | 1/1997 | Goldberg ..................... 382/186 |
| 5,623,406 A | * | 4/1997 | Ichbiah ........................... 704/3 |
| 5,634,084 A | * | 5/1997 | Malsheen et al. ........... 704/260 |
| 5,635,918 A | * | 6/1997 | Tett ............................. 340/7.29 |
| 5,663,958 A | * | 9/1997 | Ward ........................... 370/347 |
| 5,691,708 A | * | 11/1997 | Batchelder et al. ........ 340/7.29 |
| 5,850,565 A | * | 12/1998 | Wightman ...................... 710/1 |
| 5,911,485 A | * | 6/1999 | Rossmann ................... 341/22 |
| 5,928,325 A | * | 7/1999 | Shaughnessy et al. ...... 709/206 |
| 5,991,751 A | * | 11/1999 | Rivette et al. ................. 707/1 |

(Continued)

OTHER PUBLICATIONS

Zhang et al., Teach Yourself Perl 5 for Windows NT in 21 days, 1997, Sams Publishing, First Edition, pp. iii, iv, 323-332, 344-346.*

(Continued)

Primary Examiner—Saleh Najjar
Assistant Examiner—Alicia Baturay
(74) Attorney, Agent, or Firm—Duke W. Yee; Jeffrey S. LaBaw; Peter B. Manzo (57) ABSTRACT

A method, computer program product, and data processing system for compressing and abbreviating text messages at a first text messaging device for transport and subsequent interpretation at a second text messaging device is disclosed. A user-defined message length reduction profile for producing human-readable compressed text is associated with a source text message at a first text messaging device. The source text message is then shortened using abbreviations and transformation rules in the profile. The shortened text message can then be transmitted to a second text messaging device. In addition, the compression provided by the present invention, although intended to be human-readable, can be complemented with decompression software to expand the compressed and abbreviated text to its full length and verifying, using a checksum or other error detecting code, that the expanded version corresponds to the original text.

17 Claims, 5 Drawing Sheets

U.S. PATENT DOCUMENTS

| | | | | |
|---|---|---|---|---|
| 6,014,429 | A * | 1/2000 | LaPorta et al. | 379/88.15 |
| 6,081,815 | A * | 6/2000 | Spitznagel et al. | 715/501.1 |
| 6,084,952 | A * | 7/2000 | Beerman et al. | 379/93.25 |
| 6,088,699 | A * | 7/2000 | Gampper et al. | 707/10 |
| 6,150,962 | A * | 11/2000 | Rossmann | 341/22 |
| 6,205,342 | B1 * | 3/2001 | Oakes et al. | 455/566 |
| 6,223,059 | B1 * | 4/2001 | Haestrup | 455/566 |
| 6,266,639 | B1 | 7/2001 | Goldberg et al. | 704/270 |
| 6,275,789 | B1 * | 8/2001 | Moser et al. | 704/7 |
| 6,279,018 | B1 * | 8/2001 | Kudrolli et al. | 715/540 |
| 6,286,053 | B1 * | 9/2001 | Van Peursem et al. | 709/247 |
| 6,323,767 | B1 * | 11/2001 | Gropper | 340/534 |
| 6,349,202 | B1 * | 2/2002 | Odamura | 455/412.1 |
| 6,442,523 | B1 * | 8/2002 | Siegel | 704/270 |
| 6,473,621 | B1 * | 10/2002 | Heie | 455/466 |
| 6,525,676 | B2 * | 2/2003 | Kisaichi et al. | 341/22 |
| 6,553,103 | B1 * | 4/2003 | Forlenza et al. | 379/93.01 |
| 6,556,841 | B2 * | 4/2003 | Yu | 455/556.1 |
| 6,580,917 | B1 * | 6/2003 | Lefevre et al. | 455/466 |
| 6,606,373 | B1 * | 8/2003 | Martin | 379/88.01 |
| 6,700,503 | B2 * | 3/2004 | Masar et al. | 340/870.01 |
| 6,751,209 | B1 * | 6/2004 | Hamiti et al. | 370/349 |
| 6,795,822 | B1 * | 9/2004 | Matsumoto et al. | 707/10 |
| 6,804,675 | B1 * | 10/2004 | Knight et al. | 707/10 |
| 6,816,578 | B1 * | 11/2004 | Kredo et al. | 379/88.17 |
| 6,901,364 | B2 * | 5/2005 | Nguyen et al. | 704/235 |
| 6,934,767 | B1 * | 8/2005 | Jellinek | 709/247 |
| 6,950,881 | B1 * | 9/2005 | Ndili | 709/246 |
| 6,985,721 | B1 * | 1/2006 | Khorram | 455/414.1 |
| 6,989,765 | B2 * | 1/2006 | Gueziec | 340/905 |
| 7,010,478 | B2 * | 3/2006 | Mathur et al. | 704/9 |
| 7,082,312 | B2 * | 7/2006 | Zhang et al. | 455/466 |
| 2002/0169770 | A1 * | 11/2002 | Kim et al. | 707/5 |
| 2002/0184270 | A1 * | 12/2002 | Gimson | 707/529 |
| 2003/0003931 | A1 * | 1/2003 | Silventoinen et al. | 455/466 |
| 2003/0139921 | A1 * | 7/2003 | Byrd et al. | 704/10 |
| 2005/0124324 | A1 * | 6/2005 | Thomas et al. | 455/412.1 |
| 2005/0240391 | A1 * | 10/2005 | Lekutai | 704/2 |

OTHER PUBLICATIONS

Buyukkokten, O. et al., Efficient Web Browsing on Handheld Devices Using Page and Form Summarization, Jan. 2002, ACM Transactions on Information Systems (TOIS), vol. 20, Issue 1, pp. 82-115.*

IBM Technical Disclosure Bulletin, "Methodology for Nickname Creation via Contextual Salutations", vol. 36, 36, No. 3, Mar. 1993, pp. 381-382.

IBM Technical Disclosure Bulletin, "Methodology for Nickname Creation on Reception via Contextual Closings", No. 7, Dec. 1992, pp. 171-172.

* cited by examiner

```
            400              402      404
              \              /        /
%dictionary = {"chief executive officer" => "CEO"
               "for your information" => "FYI"
```

*FIG. 4A*

```
       ┌ sub remvowels {         ─412
       │ my ($string) = @_;
   410 ┤ $string =~ s/[aeiou]+//gi;  ─414
       │ return $string;  ─416
       │ }
       └
```

COMPRESSION AND ABBREVIATION FOR FIXED LENGTH MESSAGING

BACKGROUND OF THE INVENTION

1. Technical Field

The present invention relates generally to the preparation of text messages for transmission between devices. In particular, the present invention is directed toward the preparation of human-readable compressed versions of text messages.

2. Description of Related Art

Text messaging devices, such as two-way alphanumeric pagers, text-enabled mobile telephone, wireless portable digital assistants (PDAs), computers operating instant messaging software, and other like devices allow users to transmit short text messages to other messaging device users. Generally, the size of text messages that may be transmitted is limited to some pre-determined level.

Lossless digital data compression techniques, such as Huffman codes or Lempel-Ziv compression, can sometimes reduce the length of a text message, but require that the recipient of the message be capable of decoding the compressed data, as conventional compression renders a text message unreadable to humans. It should also be noted that because of necessary overhead associated with conventional compression algorithms, conventional lossless compression algorithms tend to be less useful for smaller messages.

Abbreviations, shorthand, and other human-readable forms of text shortening have been used for centuries to save time or writing space. Acronyms and abbreviations such as PERL (Practical Extraction and Reporting Language) and UML (Uniform Modeling Language) are especially prevalent in the computing arts, for example. The elimination of vowels is another known technique for reducing the length of text in a human-readable fashion. For example, SPEED-WRITING is a trademark for a form of shorthand in which short vowels are generally eliminated from words. The written Hebrew language actually dispenses with vowels altogether, as the Hebrew alphabet consists of only consonants. Words that convey little meaning, such as "the" are often eliminated from newspaper headlines, telegrams, and other media where space is at a premium (e.g., "Dog bites man," rather than "A dog bit a man").

Computer technology has been applied to the problem of shortening text in a human-readable way. U.S. Pat. No. 6,279,018 to Kudrolli et al. describes a system for abbreviating and compacting text to cope with display space constraints in computer software. Kudrolli et al. describe using a computer algorithm to abbreviate words and phrases in text according to a user-defined dictionary of abbreviations. Kudrolli et al. also describe applying compressive transformations to text, such as eliminating vowels and whitespace to further reduce the size of the text to a level that fits within length constraints.

The algorithmic compression and abbreviation provided by Kudrolli et al., however, is adapted for use by a single user specifying rules for displaying text on that user's display. The Kudrolli et al. reference is not directed toward shortening text messages for transport and subsequent interpretation by a recipient. What is needed, therefore, is a compression and abbreviation scheme that is adapted for use in shortening text messages for transport to a second text messaging device associated with a second user.

SUMMARY OF THE INVENTION

The present invention provides a method, computer program product, and data processing system for compressing and abbreviating text messages at a first text messaging device for transport and subsequent interpretation at a second text messaging device. A message length reduction profile containing a dictionary of abbreviations and selected compressive transformation rules is associated with a source text message at a first text messaging device. The source text message is then shortened using the abbreviations and transformation rules in the profile. The shortened text message can then be transmitted to a second text messaging device. The profile can be selected from a plurality of profiles based on the intended recipient, so that the text message is shortened according to the intended recipient's preferences. Alternatively, the profile or a portion thereof may be transmitted to the second text messaging device so as to aid the second text messaging device or its user in interpreting the shortened text message.

In addition, the compression provided by the present invention, although intended to be human-readable, can be complemented with decompression software to expand the compressed and abbreviated text to its full length version by attempting to reverse the compressive transformations made to the text and verifying, using a checksum or other error detecting code, that the expanded version corresponds to the original text.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
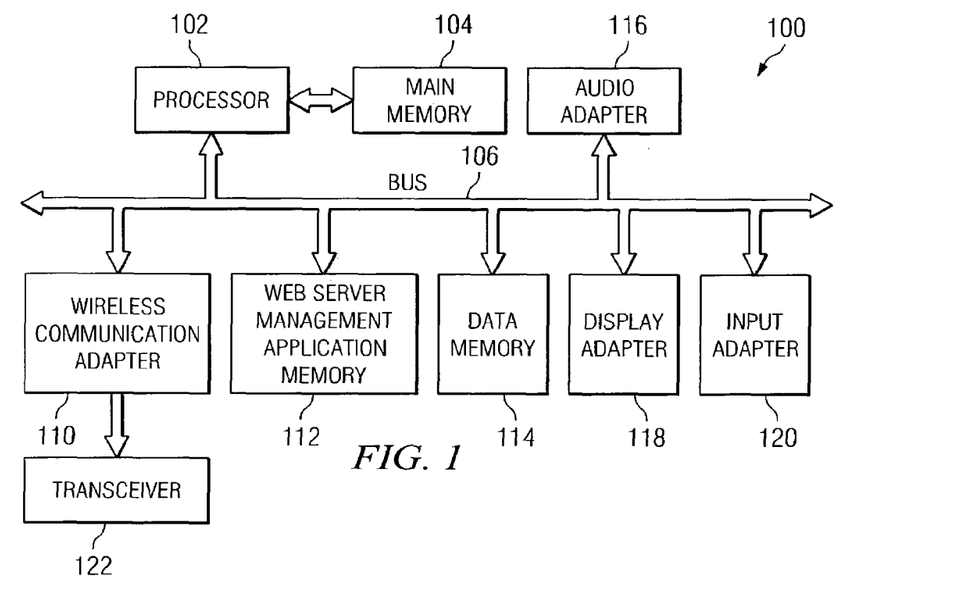
FIG. 1 is a block diagram of a digital messaging device in which the present invention may be implemented.

FIG. 1 is an exemplary block diagram illustrating a portable messaging device in accordance with the present invention. As shown in FIG. 1, the portable messaging device 100 includes a processor 102, a main memory 104, a wireless communication adapter 110, an application memory 112, a data memory 114, an optional audio adapter 116, and a display adapter 118, an input adapter 120, and a transceiver 122. These elements are coupled to one another via the control/data bus 106. Although FIG. 1 shows three different memories 104, 112 and 114, it should be appreciated by those of ordinary skill in the art that two or more of these memories may be combined into a single memory device capable of storing data corresponding to each memory individually.

Portable messaging device 100 operates by executing programs stored in main memory 104 using processor 102. In addition, the portable messaging device 100 includes messaging application software stored in application memory 112. This application may be executed by the portable digital device 100 to perform various functions related to sending text messages via the wireless communication adapter 110 and transceiver 122. Wireless communication adapter 110 and transceiver 122 are used to send and receive data messages via a wireless communication link to another messaging device, generally relayed through some form of base station or repeater.

Figure 2:
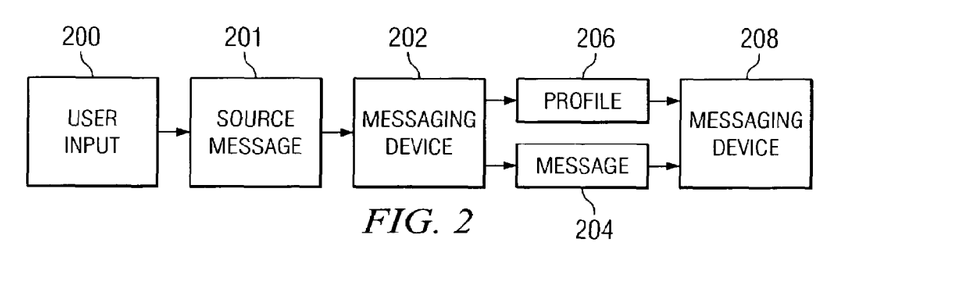
FIG. 2 is a block diagram providing an overall view of the operation of a preferred embodiment of the present invention.

The present invention is directed toward the compression and abbreviation of a source text message at a first messaging device into a shortened text message for transmission to and subsequent interpretation at a second messaging device. FIG. 2 is a diagram providing a general overview of a text messaging process in accordance with a preferred embodiment of the present invention. User input 200 provides a first messaging device 202 with a source text message 201. Messaging device 202 shortens source text message 201 in accordance with a pre-defined message length reduction profile 206, which may contain a personal dictionary of preferred abbreviations, acronyms and/or other compressive transformation rules that reduce the size of source text message 201 while still allowing the shortened text message (text message 204) to be human-readable. It should be noted that throughout this application, when the term "abbreviation" is used, acronyms (which are a form of abbreviation) are also included within the scope of that term.

Messaging device 202 transmits shortened text message 204 and message length reduction profile 206 to a second messaging device 208. Messaging device 208 may then use message length reduction profile 206 to expand abbreviations into their full-length text meanings and/or reverse the effects of any compressive transformation rules applied to text message 204 to yield at least an approximation to the original message.

In an alternative embodiment, message length reduction profile 206 may be known ahead-of-time by both messaging device 202 and messaging device 208. For example, the user of messaging device 208 may have defined a profile that that user shares with a user of messaging device 202, or alternatively, the profile may be made available for download from a server or other form of public repository. In either case, messaging device 202 will know to use the profile defined by the user of messaging device 208 whenever transmitting text messages to messaging device 208. In such circumstances, transmission of message length reduction profile 206 from messaging device 202 to messaging device 208 can be avoided.

Figure 3:
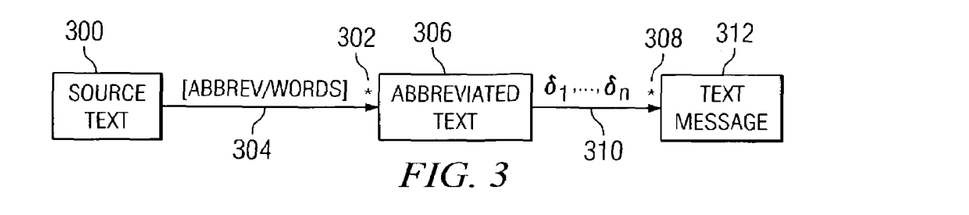
FIG. 3 is a block diagram providing an overall view of a process of abbreviating and compressing text messages in accordance with a preferred embodiment of the present invention.

FIG. 3 is a diagram depicting an overall process of abbreviation and compressing a text message in accordance with a preferred embodiment of the present invention. A source text message 300 is first shortened by repeated application 302 (repeated application of a rule being denoted by the symbol →*) of abbreviation rules 304 from a personal dictionary of abbreviations associated with the message length reduction profile being utilized. In Computer Science, the notation [x/y] generally refers to a function or rule that substitutes a syntactic element "x" for a syntactic element "y" in an expression or string. In FIG. 3, the notation "[abbrev/words]" refers to the fact that abbreviation rules 304 consist of replacement rules that replace words or phrases in source text 300 with abbreviations.

Figure 4A:
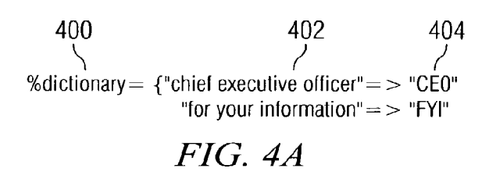
FIG. 4A is a representation, in a Perl-like pseudocode, of a personal dictionary of abbreviations in a message length reduction profile in accordance with a preferred embodiment of the present invention.

A personal dictionary of abbreviations may be implemented in the form of an associative array, as is shown in a Perl-like pseudocode in FIG. 4A. Associative array "%dictionary" 400 comprises name-value pairs mapping a full-length character string (e.g., string 402) to an associated abbreviation (e.g., abbreviation 404).

Returning now to FIG. 3, after repeatedly applying abbreviation rules 304, to source text 300, an abbreviated text 306 is obtained. Next, repeated application 308 of compressive transformation rules 310 (denoted $\delta_1, \ldots, \delta_n$) obtains a shortened text message 312. Compressive transformation rules 310 consist of rules or computable functions that map a text message into a shorter, but human-readable version of the text message.

Figure 4B:
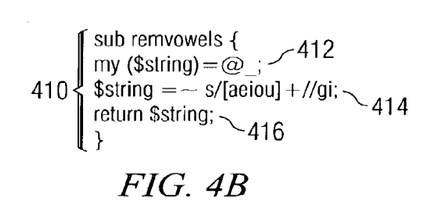
FIG. 4B is a representation, in a Perl-like pseudocode, of a compressive transformation rule implemented as a function in accordance with a preferred embodiment of the present invention.

FIG. 4B is a diagram providing an example of a compressive transformation rule encoded as a function in Perl-like pseudocode. Function 410 encodes a compressive transformation rule for eliminating vowels from a text message. This is an example of a compressive transformation rule that results in a reduced character set representation of an original text message. It should be noted that in an actual embodiment, different characters may be eliminated, other than vowels. For instance, in other languages, different letters may be eliminated, other than, or in addition to vowels, or a combination of letters may be replaced by a smaller combination of letters. For example, in German, the letter "c" is almost always followed by "h" or "k" unless it is found in a foreign-derived word. Thus, the letter "c" in German is somewhat redundant. A compressive transformation rule intended for use with German might either eliminate the letter "c" or replace "ch" with a single letter, such as "g" or "k," that has a similar sound (e.g., in German, the word "ich" and the monosyllabic nonsense word "ig" would be pronounced the same way).

It should also be noted that when a compressive transformation rule utilizing a reduced character set is used in conjunction with abbreviations or acronyms that may contain characters not found in the reduced character set, it is important that the application of the reduced character set compressive transformation rule does not interfere with the use of abbreviations. For example, if a compressive transformation rule to eliminate vowels is used in conjunction with abbreviations and acronyms that contain vowels, such as "FYI," it is important that the vowels in the abbreviation or acronym are not eliminated by the compressive transformation rule (e.g., it is important that "FYI" not be compressed to "FY" for proper understanding of the message). This can be prevented in a number of ways. One possible technique that can be used is to apply the reduced character set rule first, then apply abbreviations whose "full length" text is actually a reduced character set representation of the true full length text.

Turning now to FIG. 4B, at line 412, function 410 takes a single string containing a text message as an argument. On line 414, each substring of one or more consecutive vowels is replaced within the string with an empty string (i.e., the vowels are removed from the string). On line 416, the string is returned with vowels removed. One of ordinary skill in the art will recognize that any number of compressive transformation rules encoded as functions mapping a string into a modified string may be applied through function composition to a text message, such as abbreviated text 306 in FIG. 3, to yield a shortened text message (e.g., text message 312 in FIG. 3) in accordance with a message length reduction policy comprising a number of compressive transformation rules.

Other examples of compressive transformation rules include converting words that represent numbers into numerals, eliminating whitespace, eliminating whitespace while capitalizing the first letter of each word, elimination of less valuable words or phrases, and elimination of words that would be understood according to context (e.g., "She is taller than I am," can be written as "She is taller than I", with no loss of meaning.).

An additional example of a compressive transformation rule would be to take very commonly used words and replace them with single characters or single character prefixes. Some possible substitutions that can be used while still preserving readability (in the [substitution/original] notation described above) —include, but are not limited to: [T/the], [O/of], [&/and], [2/to], [a/a] (assuming whitespace is eliminated, e.g., [adog/a dog]), and [N/in]. For example, the phrase "the dog" could be replaced with "Tdog" at a savings of four characters.

Although exhaustive application of abbreviation rules 304 and compressive transformation rules 310 may result in an optimally shortened text message, one of ordinary skill in the art will recognize that such rules may also be applied to a limited degree to achieve a less optimally, but adequately shortened text message. For example, in a preferred embodiment of the present invention, abbreviation rules 304 and compressive tranformation rules 310 may be applied to only the extent necessary to reduce source text message 300 to a length that fits within specified length constraints.

Figure 5:
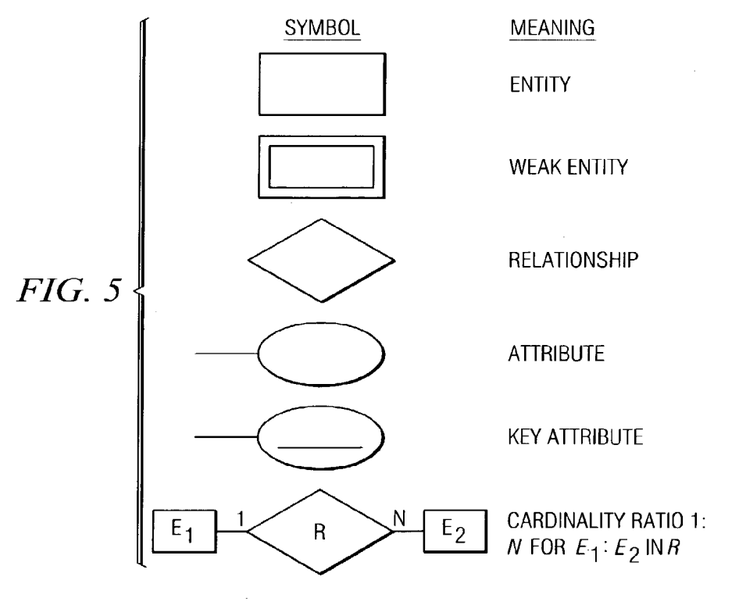
FIG. 5 is a diagram depicting symbols used in entity-relationship (E-R) diagramming.
Figure 6:
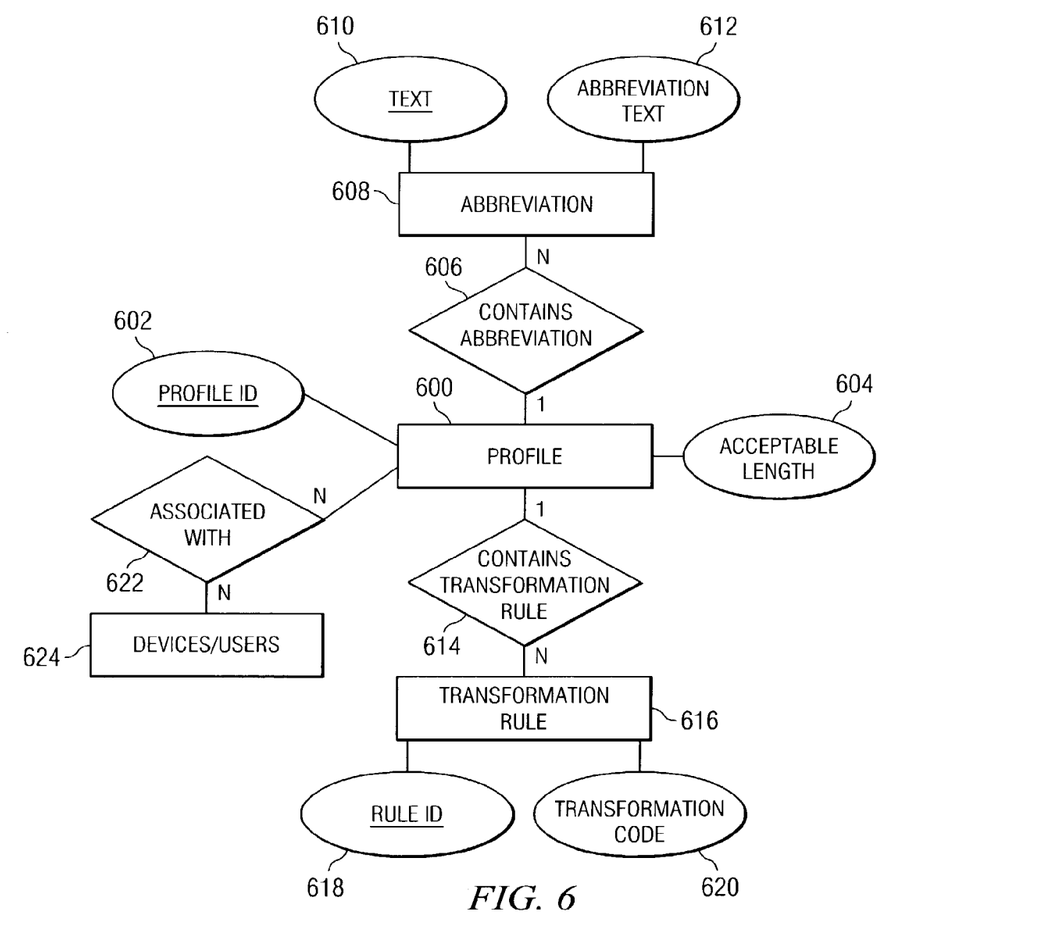
FIG. 6 is an entity-relationship (E-R) diagram of a message length reduction profile in accordance with a preferred embodiment of the present invention.

A more detailed description of the contents of a message length reduction policy in accordance with a preferred embodiment of the present invention is presented in FIG. 6 in the form of an entity-relationship (E-R) diagram. FIG. 5 describes the symbols used in the E-R diagrams in this document. One of ordinary skill in the art will recognize that the data model represented by the E-R diagram provided in FIG. 6 may be readily implemented in the form of a database (such as a relational database) or data structure(s) (such as hash tables or trees) by following well-known principles of data storage and management within the computing art.

The E-R (entity-relationship) approach to database modeling provides a semantics for the conceptual design of databases and data structures. With the E-R approach, database information is represented in terms of entities, attributes of entities, and relationships between entities, where the following definitions apply. The modeling semantics corresponding to each definition is illustrated in FIG. 5. FIG. 5 is adapted from Elmasri and Navathe, *Fundamentals of Database Systems,* 3rd Ed., Addison Wesley (2000), pp. 41-66, which contains additional material regarding E-R diagrams and is hereby incorporated by reference.

Entity: An entity is a principal object about which information is collected. For example, in a database containing information about personnel of a company, an entity might be "Employee." In E-R modeling, an entity is represented with a box. An entity may be termed weak or strong, relating its dependence on another entity. A strong entity exhibits no dependence on another entity, i.e. its existence does not require the existence of another Entity.

Attribute: An attribute is a label that gives a descriptive property to an entity (e.g., name, color, etc.). Two types of attributes exist. Key attributes distinguish among occurrences of an entity. For example, in the United States, a Social Security number is a key attribute that distinguishes between individuals. Descriptor attributes merely describe an entity occurrence (e.g., gender, weight). As shown in FIG. 5, in E-R modeling, an attribute is represented with an oval tied to the entity (box) to which it pertains.

Relationships: A relationship is a connectivity exhibited between entity occurrences. Relationships may be one to one, one to many, and many to many, and participation in a relationship by an entity may be optional or mandatory. For example, in the database containing information about personnel of a company, a relation "married to" among employee entity occurrences is one to one (if it is stated that an employee has at most one spouse). Further, participation in the relation is optional as there may exist unmarried employees. As a second example, if company policy dictates that every employee have exactly one manager, then the relationship "managed by" among employee entity occurrences is many to one (many employees may have the same manager), and mandatory (every employee must have a manager).

As shown in FIG. 5, in E-R modeling a relationship is represented with a diamond. The cardinality ratio (one-to-one, one-to-many, etc.) in a relationship is denoted by the use of the characters "1" and "N" to show 1:1 or 1:N cardinality ratios, or through the use of explicit structural constraints, as shown in FIG. 5.

FIG. 6 is an entity-relationship (E-R) diagram depicting the structure of a message length reduction profile in accordance with a preferred embodiment of the present invention. The basic entity of interest is profile entity 600, which defines a single message length reduction profile. Each profile stored by a given messaging device must be uniquely identified; thus, profile entity 600 has an associated "profile id" attribute 602, which is designated as a key attribute of profile entity 600. An acceptable length attribute 604 may store a pre-defined constraint on the length of text messages to be satisfied.

A message length reduction profile may contain a personal dictionary of abbreviations to be applied to text messages. "Contains abbreviation" relation 606 relates a single instance of profile entity 600 to multiple instances of abbreviation entity 608 to form such a personal dictionary. Abbreviation entity 608 contains a pair of attributes. Text attribute 610, which is preferably a key attribute, represents a string of unabbreviated text to be represented by an abbreviation. Abbreviation text attribute 612 is a string containing an abbreviation that is intended to stand for the text contained in text attribute 610.

An instance of profile entity 600 may also have a number of associated compressive transformation rules, such as removing vowels or whitespace, that may be applied to a source text message. "Contains transformation rule" relation 614 maps a single instance of profile entity 600 to one or more instances of transformation rule entity 616. Each instance of transformation rule entity 616 has an associated "rule id" attribute 618 that may be used to uniquely identify a transformation rule represented by an instance of transformation rule entity 616. Having a unique identifier for each transformation rule allows rules to be selected by reference for inclusion into a message length reduction profile (i.e., rules may be included in a profile by referring to them simply by their identifiers). Transformation code attribute 620 represents a rule definition or program code for performing the compressive transformation represented by an instance of transformation rule entity 616. For instance, the pseudocode provided in FIG. 4B is an example of transformation code.

Additionally, as was stated earlier, a messaging device may store a number of message length reduction profiles associated with different recipient devices and/or users. "Associated with" relation 622 is a many-to-many (N-to-N) relation associating instances of profile entity 600 to devices or users, represented as instances of devices/users entity 624.

Figure 7:
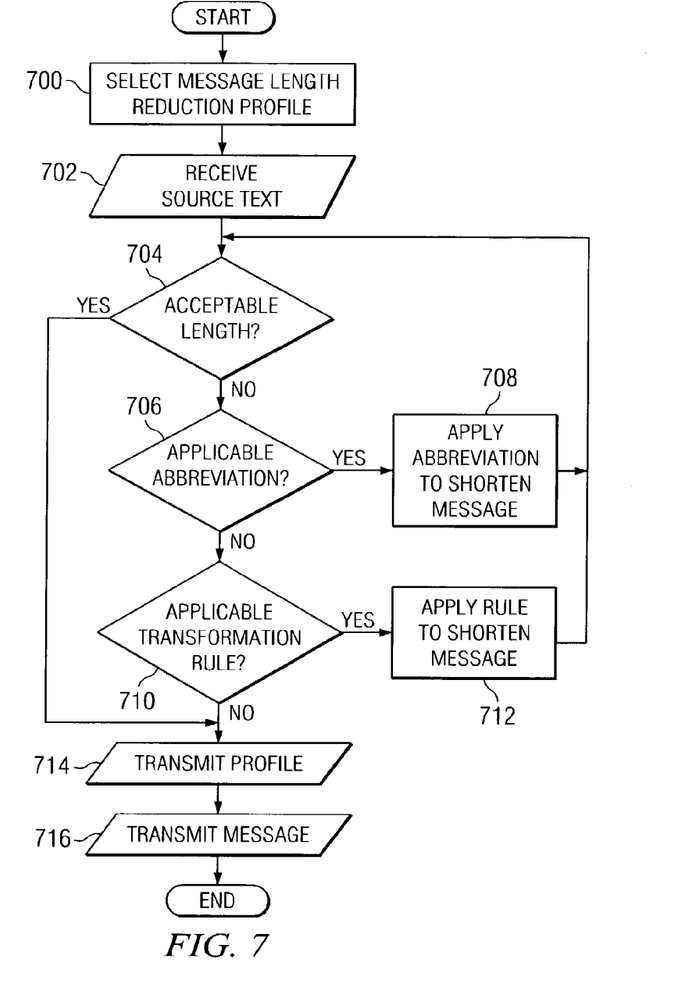
FIG. 7 is a flowchart representation of a process of a messaging device abbreviating, compressing and transmitting a text message in accordance with a preferred embodiment of the present invention.

The overall operation of a messaging device abbreviating, compressing and transmitting a text message in accordance with a preferred embodiment of the present invention is depicted in flowchart form in FIG. 7. A message length reduction profile is selected (block 700). An appropriate message length reduction profile may be selected by the user of the messaging device or it may be selected on the basis of the intended recipient of the text message to be transmitted. A source text message is received, preferably via user input (block 702). If the message fits the applicable length constraints (block 704:Yes), the process jumps to block 714, which will be described shortly.

If the message is not an acceptable length (block 704:No), a determination is made as to whether an abbreviation from the personal dictionary of abbreviations associated with the message length reduction profile may be applied to the text message in its current form (block 706). If an abbreviation may be applied (block 706:Yes), the abbreviation is applied to the text message to shorten the message (block 708) and the process cycles to block 704.

If no abbreviation may be applied (block 706:No), a determination is made as to whether a compressive transformation rule from the message length reduction profile may be applied to the text message (block 710). If so (block 710:Yes), then the compressive transformation rule is applied to shorten the message (block 712) and the process cycles to block 704.

If no compressive transformation rule from the message length reduction profile can be applied (block 710:No) or if the text message has been determined to be at an acceptable length (block 704:Yes), the process continues to block 714. The relevant portions of the message length reduction profile are transmitted to the recipient messaging device (block 714). The "relevant portions" of the message length reduction profile may include those rules and abbreviations that were actually applied to the text message or may simply consist of some type of identifier to inform the recipient device of the message length reduction profile used to shorten the text message. Alternatively, the message length reduction profile may be transmitted in its entirety or in a compressed form (e.g., using conventional lossless compression techniques) In yet another alternative embodiment, block 714 may be omitted altogether, if it can be implicitly understood by the recipient messaging device which profile was used to shorten the text message. Finally, the shortened message is transmitted to the recipient messaging device (block 716).

Figure 8:
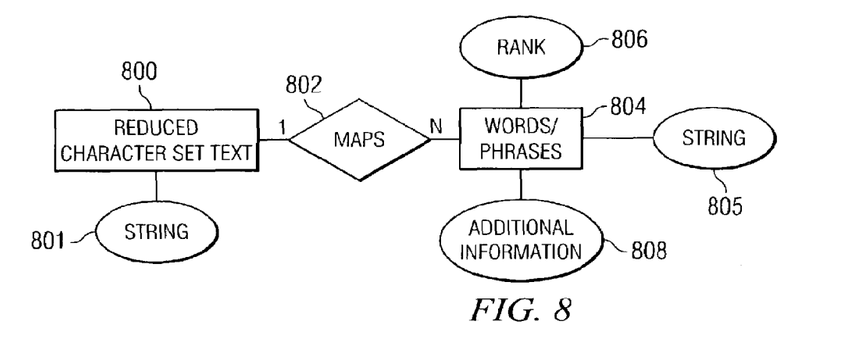
FIG. 8 is an entity-relationship diagram of a data structure for mapping reduced character set strings into full-length words and phrases in accordance with a preferred embodiment of the present invention.
Figure 9:
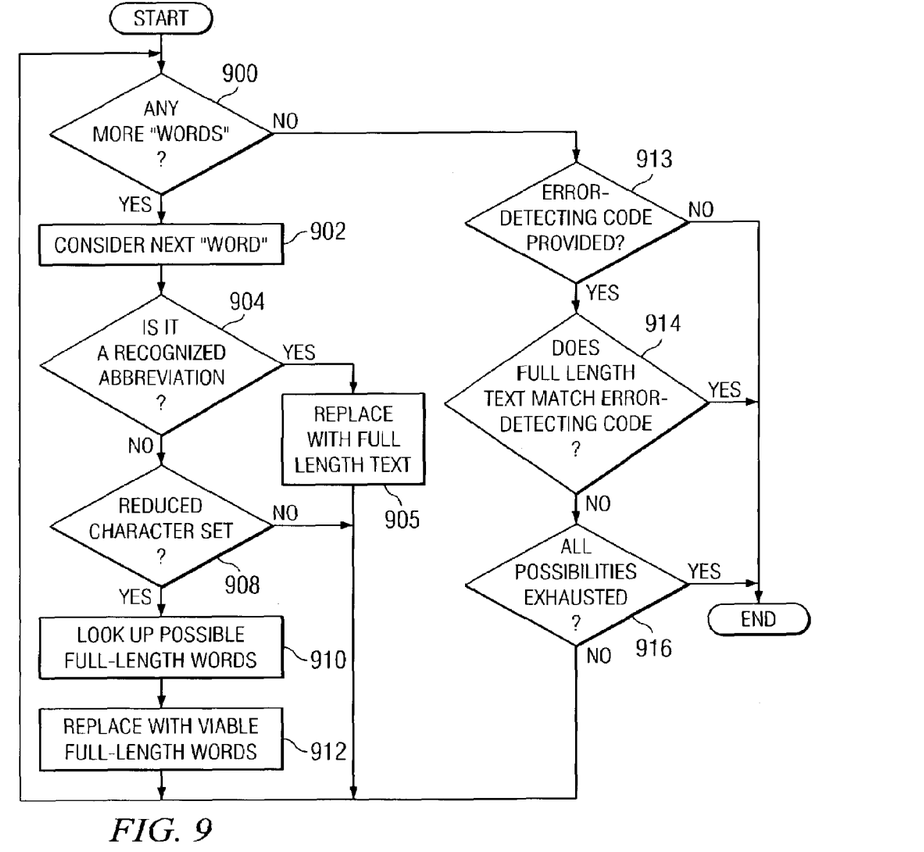
FIG. 9 is a flowchart representation of a process of expanding a shortened text message using elimination of a character set subset in accordance with a preferred embodiment of the present invention.
Figure 10:
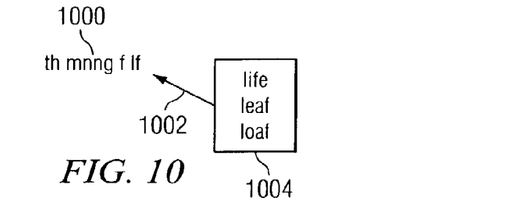
FIG. 10 is a sample display from a recipient messaging device demonstrating how candidate replacement words for a given reduced-character set word can be presented to a user of the recipient device in accordance with a preferred embodiment of the present invention.

Message length reduction profile information may be utilized in a number of ways by a recipient messaging device. For instance, when a message length reduction profile contains a personal dictionary of abbreviations, this personal dictionary may be used by the recipient device to replace the abbreviated forms of words and phrases with their full-length meanings through a reverse-lookup procedure. When the message length reduction profile associated with a text message indicates that one or more compressive transformation rules, such as eliminating vowels (or another subset of the character set or alphabet) or whitespace, have been applied to a text message, the effect of these rules may be reversed. FIGS. 8-10 depict how message length reduction profile information can be applied by a recipient device to aid in the interpretation of a text message in which a subset of the character set (such as the vowels in English) has been eliminated.

In accordance with a preferred embodiment of the present invention, a recipient device that receives a text message in which the vowels have been eliminated may make use of a data structure to map reduced character set words and phrases into full-length text. FIG. 8 is an E-R diagram of such a data structure. Reduced character set text entity 800 represents words or phrases in which certain characters (e.g., vowels) have been eliminated. The actual reduced character set words and phrases themselves may be stored as an attribute 801 of reduced character set text entity 800. Reduced character set text entity 800 participates in a 1-to-N "maps" relation 802 with words/phrases entity 804, which represents full-length words and phrases that, through "maps" relation 802, correspond to reduced character set versions of those words and phrases (reduced character set text entity 800).

Words/phrases entity 804 may have a number of attributes to aid in identifying the correct replacement word or phrase for a given reduced character set string. String attribute 805 contains the actual full-length text represented by words/phrases entity 804. A rank attribute 806 may include frequency information or other ranking information reflecting the probability that a given reduced character set string corresponds to a particular full-length word or phrase. Additional information attribute(s) 808 may contain contextual information or conditional probabilities to assist in the determination of which full-length word or phrase corresponds to a given reduced character set string in a text message.

FIG. 9 is a flowchart representation of a process of expanding a shortened text message using a data structure such as that described in FIG. 8. The flowchart in FIG. 9 represents what is known in Computer Science as a "while" loop, which is a loop in which the condition for iterating the loop is tested at the beginning of the loop. In FIG. 9 this looping condition is tested in block 900. In FIG. 9 it is assumed that the process represented by the flowchart iterates over words (or phrases) in a text message in sequence. Thus, a determination is made as to whether any subsequent words are to be found in the text message (block 900).

If the end of the text message has not been reached(block 900:Yes), the next word (or phrase) in the text message is considered (some type of regular expression pattern matcher may be employed to find the next longest match for a word or phrase, thus allowing both words and phrases to be considered) (block 902). If the next word or phrase is a recognized abbreviation (block 904:Yes), then the abbreviation is simply replaced with its corresponding full-length text (block 905) and the process cycles to block 900 to consider subsequent words or phrases. If the word or phrase is not a recognized abbreviation (block 904:No), but is in reduced character set form (block 908:Yes), a lookup operation is performed to find possible words or phrases that the reduced character set string may represent (block 910). An appropriate choice of replacement word is then selected and applied to the text message (block 912). The process then (following block 912 or block 908:No) cycles to block 900 to iterate over subsequent words or phrases in the text message.

When the end of the text message has been reached (block 900:No), a determination is made as to whether the message has been accompanied by an error-detecting code, such as a cyclic redundancy check (CRC) calculated on the original full-length source text (block 913). Appending an error detection code to a shortened text message allows the accuracy of decompression to be checked. If no such error-detecting code accompanies the message (block 913:No), the process terminates. If an error-detecting code does accompany the message (block 913:Yes), then a determination is made as to whether the expanded text message is correct according to the error-detecting code (block 914). If so (block 914:Yes), then the process ends successfully. If not (block 914:No), then a determination is made as to whether all possible expansions have been exhausted (block 916). If not (block 916:No), the process cycles to step 900 to try another possible expansion. If so (block 916:Yes), however, the process terminates. Thus, if an error-detecting code is included with the text message, the correct expansion for the shortened text message can be found in a generate-and-test fashion.

One of ordinary skill in the art will also appreciate that a data structure such as that described in FIG. 8 may also be used to help a human user decode ambiguous reduced character set words using contextual clues. FIG. 10 depicts a sample display for a recipient messaging device in accordance with a preferred embodiment of the present invention. The phrase "the meaning of life" is displayed in shortened, vowelless form as string "th mnng f lf" 1000. A pointing device (represented by cursor 1002) is used to point to ambiguous reduced character set (in this case, vowelless) words. In response to actuating the pointing device over a reduced character set word, a list 1004 of possible full-length versions of the word is displayed for the user. The list may be ordered according to frequency, ranking, or other contextual information as described in FIG. 8 to allow more probable candidate words to be displayed first.

In addition, other variations on the preferred embodiment are possible without departing from the scope and spirit of the present invention. For example, expanded text messages may be played back as audio speech using speech-synthesis technology. In addition, voice-recognition hardware or software may be employed to convert spoken word into a source text message for compression and abbreviation as needed, and subsequent transmission to a recipient device.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for text based messaging using user defined abbreviations, the method comprising:

associating, at a first text messaging device, a message length reduction profile with a source text message;

shortening the source text message only to the extent needed for the source text message to fit within a maximum message length constraint in accordance with the message length reduction profile to obtain a shortened text message;

compressing the message length reduction profile;

transmitting to a second text messaging device the message length reduction profile as compressed;

transmitting to the second text messaging device information that denotes a correspondence between the message length reduction profile and the shortened text message; and transmitting the shortened text message to the second text messaging device.

2. The method of claim 1, wherein the information that denotes a correspondence between the message length reduction profile and the shortened text message comprises an identification of the message length reduction profile.

3. The method of claim 1, wherein the message length reduction profile includes a personal dictionary of abbreviations associated with one of a user of the first text messaging device and a user of the second text messaging device.

4. The method of claim 1, wherein the message length reduction profile includes a designation of compressive transformation rules to be applied to shorten text messages.

5. The method of claim 1, wherein the message length reduction profile is associated with a user of the second text messaging device and the source text message is associated with the message length reduction profile in response to the second text messaging device being designated as an intended recipient of the text message.

6. The method of claim 1, wherein the message length reduction profile is transmitted to the second text messaging device prior to transmitting the shortened text message to the second text messaging device, and wherein the second text messaging device is adapted to perform a lookup operation to retrieve the message length reduction profile from a plurality of stored message length reduction profiles in response to receiving the shortened text message, which has been constructed using the message length reduction profile.

7. The method of claim 1, wherein the second text messaging device applies the message length reduction profile to the shortened text message to decode the text message.

8. The method of claim 1, wherein the maximum message length constraint is a pre-defined constraint on a length of the source text message.

9. A method in a data processing system comprising:
receiving a shortened text message that is a shortened version of a source text message only to the extent needed for the source text message to fit within a maximum message length constraint in accordance with a message length reduction profile, wherein at least a portion of the shortened text message includes reduced character set text in which only a subset of a character set associated with the source text message is used;
receiving the message length reduction profile associated with the shortened text message, wherein the message length reduction profile is compressed;
receiving a first error-detecting code associated with the shortened text message;
retrieving a set of full-length text strings corresponding to the reduced character set text;
selecting a full-length text string from the set of full-length text strings, wherein the full-length text string is selected on the basis of the full-length text string being a likely expansion of the reduced character set text;
expanding the shortened text message using the full-length text string to obtain an expanded text message;
calculating a second error-detecting code from the expanded text message; and
comparing the first error-detecting code with the second error-detecting code to determine whether the full-length text string is a proper expansion of the reduced character set text.

10. The method of claim 9, further comprising:
in response to a determination that the full-length text string is not a proper expansion of the reduced character set text, performing a set of actions that includes:
selecting a second full-length text string from the set of full-length text strings; and
expanding the shortened text message using the second full-length text string.

11. A data processing system for text based messaging using user defined abbreviations, the data processing system comprising:
means for associating, at a first text messaging device, a message length reduction profile with a source text message;
means for shortening the source text message only to the extent needed for the source text message to fit within a maximum message length constraint in accordance with the message length reduction profile to obtain a shortened text message;
means for compressing the message length reduction profile;
means for transmitting to a second text messaging device the message length reduction profile as compressed;
means for transmitting to the second text messaging device information that denotes a correspondence between the message length reduction profile and the shortened text message; and
means for transmitting the shortened text message to the second text messaging device.

12. A data processing system comprising:
means for receiving a shortened text message that is a shortened version of a source text message only to the extent needed for the source text message to fit within a maximum message length constraint in accordance with a message length reduction profile, wherein at least a portion of the shortened text message includes reduced character set text in which only a subset of a character set associated with the source text message is used;
means for receiving the message length reduction profile associated with the shortened text message, wherein the message length reduction profile is compressed;
means for receiving a first error-detecting code associated with the shortened text message;
means for retrieving a set of full-length text strings corresponding to the reduced character set text;
means for selecting a full-length text string from the set of full-length text strings, wherein the full-length text string is selected on the basis of the full-length text string being a likely expansion of the reduced character set text;
means for expanding the shortened text message using the full-length text string to obtain an expanded text message;
means for calculating a second error-detecting code from the expanded text message; and
means for comparing the first error-detecting code with the second error-detecting code to determine whether the full-length text string is a proper expansion of the reduced character set text.

13. The data processing system of claim 12, further comprising:
means, responsive to a determination that the full-length text string is not a proper expansion of the reduced character set text, for performing a set of actions that includes:
means for selecting a second full-length text string from the set of full-length text strings; and
means for expanding the shortened text message using the second full-length text string.

14. The method of claim 1, wherein the message length reduction profile is known ahead of time by the first text messaging device and the second text messaging device.

15. The method of claim 1, wherein the message length reduction profile is one of shared by the first text messaging device and the second text messaging device, and downloadable from a server.

16. The method of claim 3, wherein the personal dictionary of abbreviations is in the form of an associative array.

17. The method of claim 4, wherein the compressive transformation rules map a text message into a shorter but human-readable text message.

* * * * *